Patented May 14, 1929.

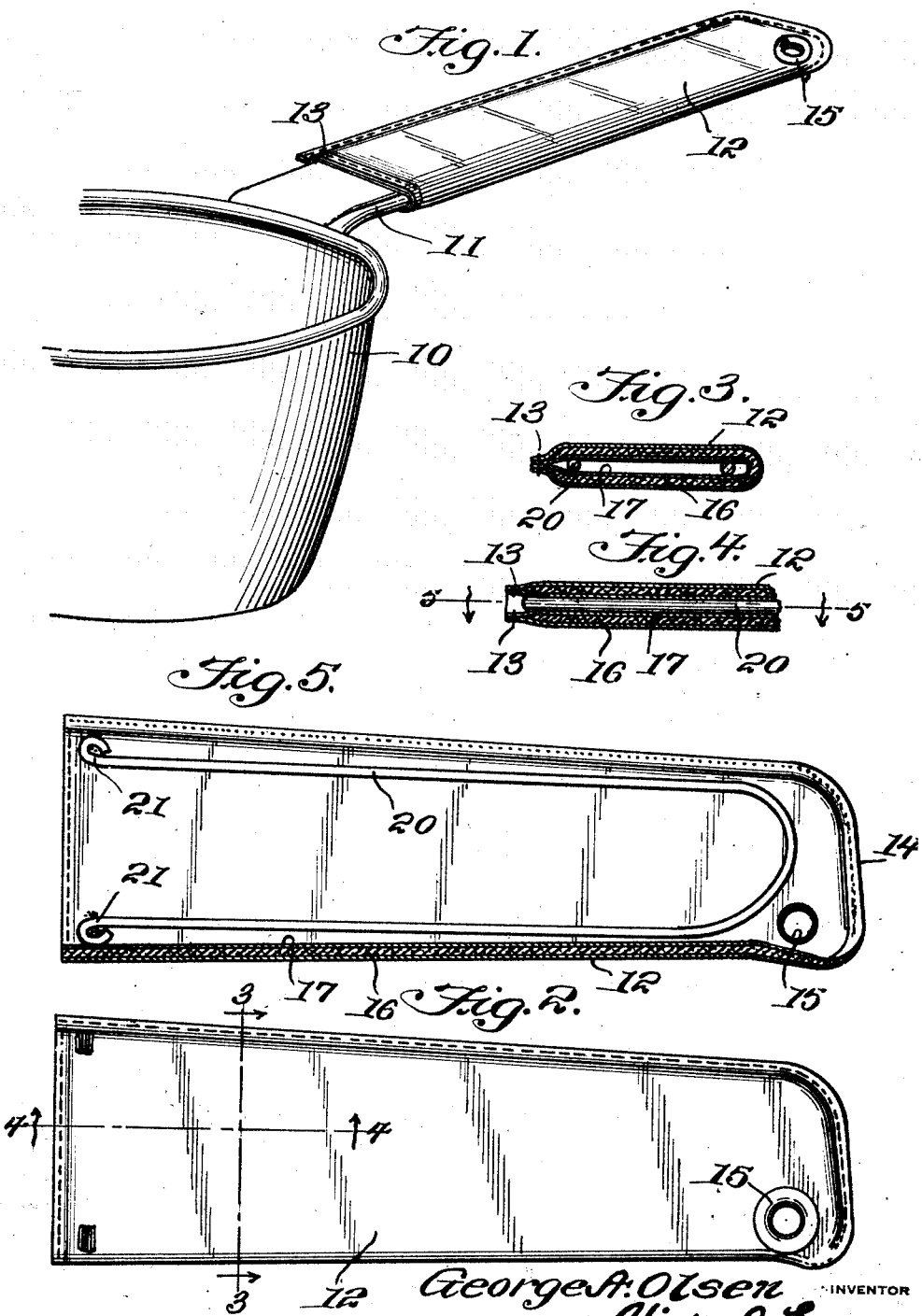

1,712,675

UNITED STATES PATENT OFFICE.

GEORGE A. OLSEN, OF JERSEY CITY, NEW JERSEY.

UTENSIL-HOLDING DEVICE.

Application filed September 27, 1928. Serial No. 308,771.

The object of this invention is to provide a heat insulating element adapted for use in handling hot kitchen utensils and the like of the type in which a laterally extending handle member is affixed to the side of the utensil.

A further object is to provide particular reinforcing or stiffening means and a particular construction for the walls of the holder, so that the device will retain its shape indefinitely, will permit the user to obtain a firm grip on the handle, and will under all conditions prevent burning of the fingers and also discomfort in any degree.

A further object is to provide supporting means permitting the suspension of the device from a hook or the like when not in use.

With the foregoing and other objects in view, the invention consists in the novel construction and arrangement of elements described, illustrated and claimed, it being understood that modifications may be made within the scope of the claims without departing from the spirit of the invention.

In the drawing forming part of this application:—

Figure 1 is a perspective view showing a portion of a utensil of the type known as a saucepan, the holder forming the subject matter of this case being applied to the handle.

Figure 2 is a plan view of the holder.

Figure 3 is a transverse section on the line 3—3 of Figure 2.

Figure 4 is a fragmentary view in longitudinal section on the line 4—4 of Fig. 2.

Figure 5 is a longitudinal section on the line 5—5 of Figure 4.

That portion of the utensil illustrated in Figure 1 is shown conventionally at 10, and a handle 11 is assumed to be applied in any well known manner as by riveting or welding.

The holder comprises an outer casing or the like of fabric of any suitable character, this casing being of tubular form and being designated 12 and which may readily be produced by folding over longitudinally a single strip of material and securing the meeting edges by stitching or the like as indicated at 13. Not only the long edges, but also the end portions may be similarly secured as indicated at 14, an annular element of the eyelet type, but sufficiently large for the purpose passes through the several thicknesses of the holder, and is designated 15. This device 15 provides means for supporting the holder on a hook or the like when not in use, or in view of the resilient gripping means described below the utensil itself may be suspended with the holder applied to the handle, as when said holder is in actual use.

Within the outer casing 12 is a filling material or layer of asbestos 16, and a lining 17 is applied within the layer of asbestos, the said lining having edge portions connected by the same line of stitching, if desired, as that employed in securing the edges of the outer casing 12. The edges of the asbestos strip need not be retained by the stitching, but said edge portions have the position shown in Figure 3 with reference to the line of stitching.

Within the tubular structure comprising the three layers indicated, I preferably employ a resilient device comprising a U-shaped wire structure 20 having outwardly turned or rolled ends 21 adapted to bear on the inner walls of the tubular structure, the entire U-shaped element providing a reinforcement or stiffening element for the holder, so that it will always be expanded and semi-rigid, and therefore in condition for immediate use, with the left hand portion, as shown in Figures 2 and 5 open, the right hand end constituting the closed end. Whereas the U-shaped element is shown as being formed of wire or the like, it may also be formed of a channel-shaped strip, the open sides of the channel being inwardly turned, so that the resilient element as a whole will more closely contact with the edge portions of the handle 11 of the utensil.

Having described the invention what is claimed is:

1. In a holder for utensils, an outer casing of tubular form and an inner tubular member of heat insulating material, and a metallic reinforcing element within the inner member.

2. In a holder for utensils, an outer casing of tubular form, an inner tubular member of heat insulating material, and a U-shaped stiffening element within the inner member.

3. In a holder for utensils, an outer casing formed of fabric folded over and having its meeting edges connected together, a tubular element of heat insulating material within the casing, and a resilient metallic element of U form retained in the insulating element by resilient contact therewith.

4. In a holder for utensils, a tubular structure comprising inner and outer layers spaced apart, a layer of heat insulating material between the layers first named, and means for holding said tubular structure in extended form.

5. In a holder for utensils, a tubular structure comprising inner and outer layers spaced apart, a layer of heat insulating material between the layers first named, and means for holding said tubular structure in extended form, and annular means passing through all of the layers near one end thereof.

In testimony whereof I affix my signature.

GEORGE A. OLSEN.